(12) United States Patent
Ikegami

(10) Patent No.: US 9,601,934 B2
(45) Date of Patent: Mar. 21, 2017

(54) CHARGING STANDS ARRANGED ADJACENTLY TO REDUCE OCCUPIED AREA

(71) Applicant: Yohei Ikegami, Kanagawa (JP)

(72) Inventor: Yohei Ikegami, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 119 days.

(21) Appl. No.: 14/350,119

(22) PCT Filed: Oct. 2, 2012

(86) PCT No.: PCT/JP2012/075512
§ 371 (c)(1),
(2) Date: Apr. 7, 2014

(87) PCT Pub. No.: WO2013/061732
PCT Pub. Date: May 2, 2013

(65) Prior Publication Data
US 2014/0232341 A1   Aug. 21, 2014

(30) Foreign Application Priority Data
Oct. 27, 2011   (JP) ................. 2011-236237

(51) Int. Cl.
*H02J 7/00*        (2006.01)
*H01M 10/46*       (2006.01)

(52) U.S. Cl.
CPC .......... *H02J 7/0044* (2013.01); *H02J 7/0027* (2013.01); *H02J 7/0042* (2013.01); *H01M 10/46* (2013.01)

(58) Field of Classification Search
CPC ....... H02J 7/0027; H02J 7/0042; H02J 7/0044
(Continued)

(56) References Cited

U.S. PATENT DOCUMENTS 5,280,229 A    1/1994  Faude et al.
5,963,014 A *  10/1999 Chen ........................ 320/110
(Continued)

FOREIGN PATENT DOCUMENTS

CN         1063584 A     8/1992
CN       101567576 A    10/2009
(Continued)

OTHER PUBLICATIONS

Communication dated Mar. 30, 2015 from the State Intellectual Property Office of the People's Republic of China in counterpart application No. 201280052648.2.
(Continued)

*Primary Examiner* — Richard Isla Rodas
*Assistant Examiner* — Manuel Hernandez
(74) *Attorney, Agent, or Firm* — Sughrue Mion, PLLC

(57) ABSTRACT

Provided is a charging stand which, with a simple structure, prevents a force applied to a power cord from being transmitted directly to a connecting portion between the charging stand and the power cord.
A charging stand 100 comprises a housing 110 having a seat portion 114 for placing an electronic apparatus 300 thereon and a charging mechanism for charging the electronic apparatus 300 when the electronic apparatus 300 is placed on the seat portion 114. A cord winding structure 140 for winding thereon a power cord 220 adapted to be connected to the charging stand 100 is provided at a bottom surface of the housing 100.

3 Claims, 15 Drawing Sheets

(58) Field of Classification Search
USPC .......................................... 320/111, 114, 115
See application file for complete search history.

(56) References Cited

U.S. PATENT DOCUMENTS

| | | | |
|---|---|---|---|
| 6,204,632 B1* | 3/2001 | Nierescher et al. | 320/116 |
| 7,057,374 B2* | 6/2006 | Freas et al. | 320/116 |
| 7,563,130 B2* | 7/2009 | Farrar et al. | 439/501 |
| 7,755,323 B2* | 7/2010 | Wu | 320/114 |
| 7,815,025 B2* | 10/2010 | Chen et al. | 191/12 R |
| 7,871,291 B2* | 1/2011 | Tracy et al. | 439/501 |
| 8,400,104 B2* | 3/2013 | Adamczyk et al. | 320/108 |
| 8,436,576 B2 | 5/2013 | Toya et al. | |
| 2002/0064041 A1* | 5/2002 | Parker | 362/183 |
| 2004/0160211 A1 | 8/2004 | Wei | |
| 2004/0196000 A1* | 10/2004 | Wei | 320/111 |
| 2006/0208697 A1* | 9/2006 | Chan et al. | 320/116 |
| 2007/0216352 A1* | 9/2007 | Shaddle | H02J 7/0044 320/114 |
| 2009/0267559 A1* | 10/2009 | Toya | H02J 7/025 320/108 |
| 2009/0267560 A1 | 10/2009 | Toya et al. | |
| 2010/0013432 A1* | 1/2010 | Toya | H02J 7/0027 320/108 |
| 2010/0139950 A1* | 6/2010 | Chen | 174/135 |
| 2011/0084657 A1* | 4/2011 | Toya | H02J 7/0044 320/108 |

FOREIGN PATENT DOCUMENTS

| | | |
|---|---|---|
| JP | 62-120829 A | 6/1987 |
| JP | 63-132637 U | 8/1988 |
| JP | 2001-65891 A | 3/2001 |
| JP | 3097465 U | 8/2003 |
| JP | 3125800 A | 9/2006 |
| JP | 2010-206881 A | 9/2010 |

OTHER PUBLICATIONS

Communication dated Nov. 4, 2015 from the State Intellectual Property of the P.R. China issued in corresponding application No. 201280052648.2.

* cited by examiner

CHARGING STANDS ARRANGED ADJACENTLY TO REDUCE OCCUPIED AREA

CROSS REFERENCE TO RELATED APPLICATIONS

This application is a National Stage of International Application No. PCT/JP2012/075512 filed Oct. 2, 2012, claiming priority based on Japanese Patent Application No. 2011-236237 filed Oct. 27, 2011, the contents of all of which are incorporated herein by reference in their entirety.

TECHNICAL FIELD

This invention relates to a charging stand for use in charging an electronic apparatus.

BACKGROUND ART

Conventionally, there is known a charging stand comprising a housing having a cradle portion for placing an electronic apparatus thereon and a charging mechanism for charging the electronic apparatus when the electronic apparatus is placed on the cradle portion (see, e.g. Patent Document 1).

The charging stand described in Patent Document 1 receives power supply through a power cord connected to a power connector provided at a rear surface of the housing.

PRIOR ART DOCUMENT

Patent Document

Patent Document 1: JP-A-2010-206881

SUMMARY OF THE INVENTION

Problem to be Solved by the Invention

However, with the charging stand described in Patent Document 1, there has been a problem that when, for example, a user's hand catches the power cord or the power cord is pulled, an unexpected force may be applied to the power cord and, as a result, that the force may be imposed directly on a connecting portion between the charging stand and the power cord (in Patent Document 1, to the power connector and a connection plug) to cause damage to the connecting portion between the charging stand and the power cord or to cause the power cord to come off the charging stand.

Therefore, this invention aims to solve the conventional problem, that is, it is an object of this invention to provide a charging stand which, with a simple structure, prevents a force applied to a power cord from being imposed directly on a connecting portion between the charging stand and the power cord.

Means for Solving the Problem

A charging stand according to this invention comprises a housing having a seat portion for placing an electronic apparatus thereon and a charging mechanism for charging the electronic apparatus when the electronic apparatus is placed on the seat portion. The charging stand has a cord winding structure which is provided on a bottom surface of the housing and which is for winding thereon a power cord adapted to be connected to the charging stand. With this structure, the above-mentioned problem has been solved.

Effect of the Invention

According to this invention, it is possible to prevent, with a simple structure, a force applied to a power cord from being imposed directly on a connecting portion between a charging stand and the power cord.

MODE FOR CARRYING OUT THE INVENTION

Figure 1:
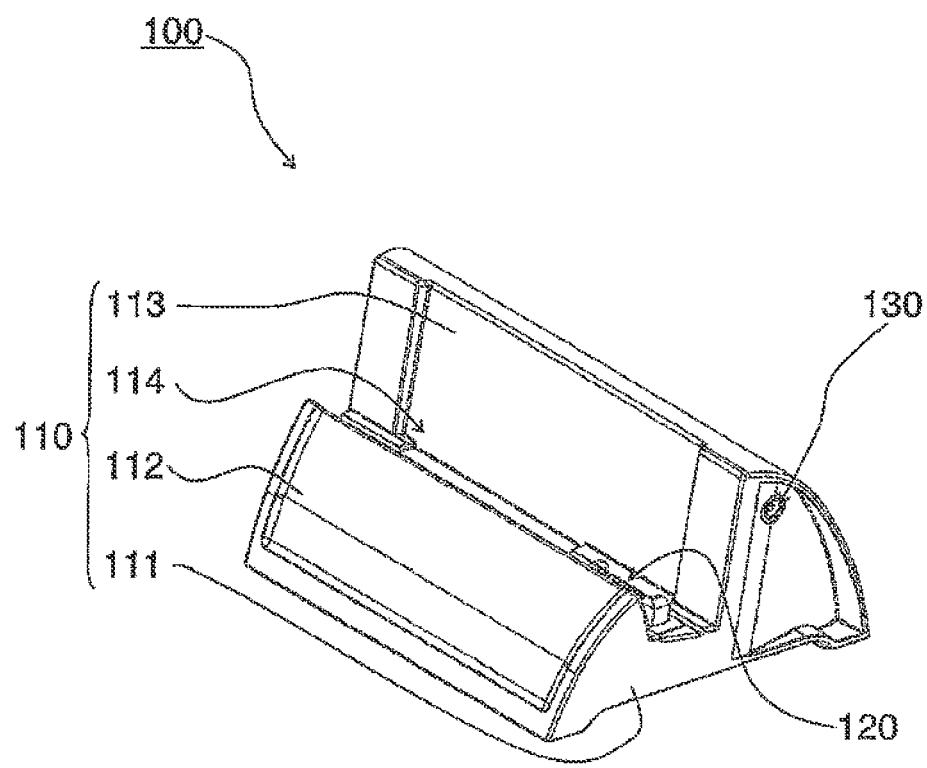
FIG. 1 is a perspective view showing a charging stand according to an embodiment of this invention.
Figure 2:
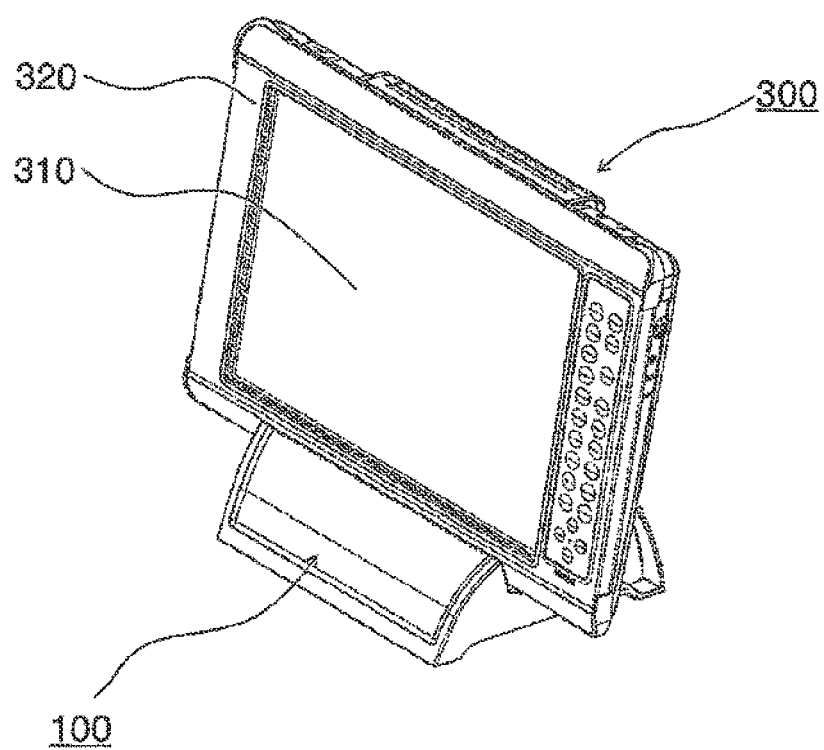
FIG. 2 is a perspective view showing a state where an electronic apparatus is placed on the charging stand.

Hereinbelow, a charging stand according to an embodiment of this invention will be described with reference to the drawings.

Embodiment

As shown in FIGS. 1 to 5, a charging stand 100 according to an embodiment of this invention supports a placed electronic apparatus 300 in a predetermined posture, receives power supply from an AC adapter unit 200 attached to the charging stand 100, and charges a secondary battery (not illustrated) of the electronic apparatus 300 by supplying power thereto.

The charging stand 100 comprises a housing 110, a charging terminal 120, a power connector 130, a cord winding structure 140, fixing portions 150, leg portions 160, and a receiving recess 170.

As shown in FIG. 1, the housing 110 has a base portion 111, a front support portion 112 formed at an upper surface of the base portion 111 and adapted to be located on the front side of the electronic apparatus 300 when the electronic apparatus 300 is placed, a back support portion 113 formed at the upper surface of the base portion 111 and adapted to be located on the back side of the electronic apparatus 300 when the electronic apparatus 300 is placed, and a seat portion 114 formed between the front support portion 112 and the back support portion 113 for placing the electronic apparatus 300 thereon.

As shown in FIG. 1, the charging terminal 120 is disposed at the upper surface of the base portion 111 in a region between the front support portion 112 and the back support portion 113. The charging terminal 120 is provided at a position which is brought into contact with a charging terminal (not illustrated) of the electronic apparatus 300 when the electronic apparatus 300 is placed on the seat portion 114. The charging terminal 120 is mounted on a circuit board (not illustrated) disposed in the housing 110 and the circuit board (not illustrated) and the charging terminal 120 are connected to the power connector 130 through a conductive member (not illustrated) disposed in the housing 110. A weight for adjusting the weight of the charging stand 100 is also disposed in the housing 110.

Figure 3:
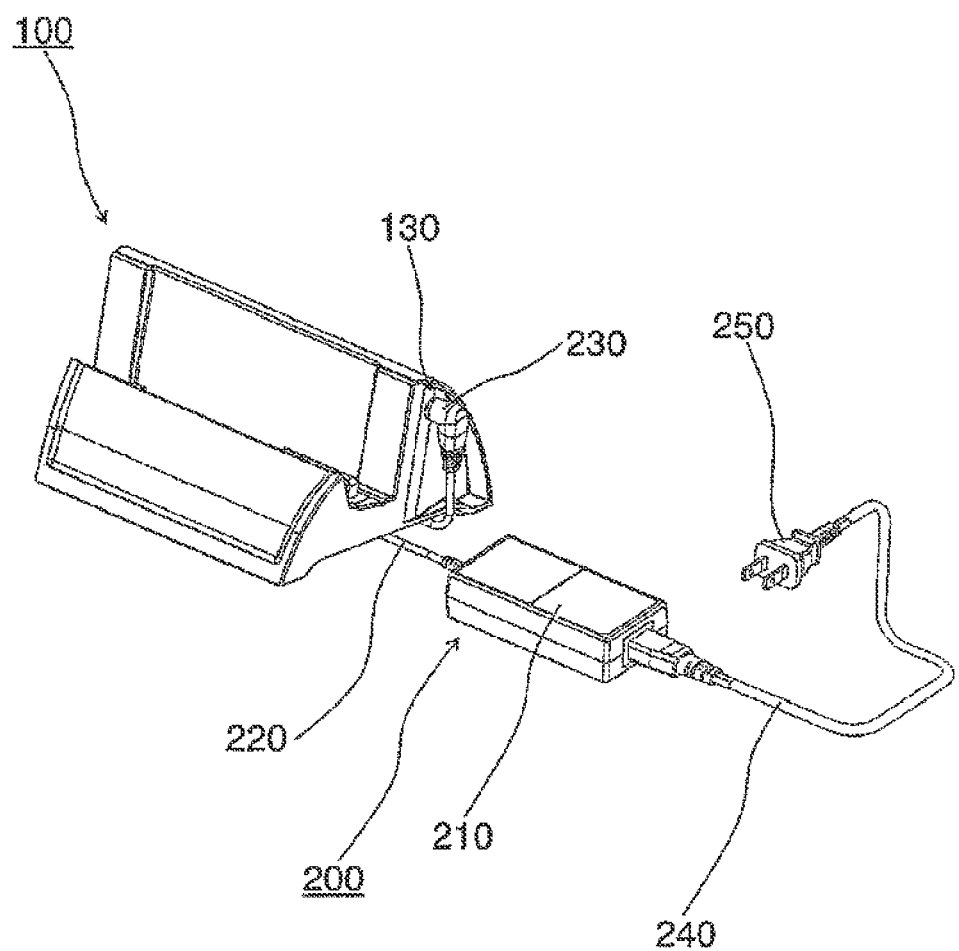
FIG. 3 is a perspective view showing a state where an AC adapter unit is attached to the charging stand.
Figure 4:
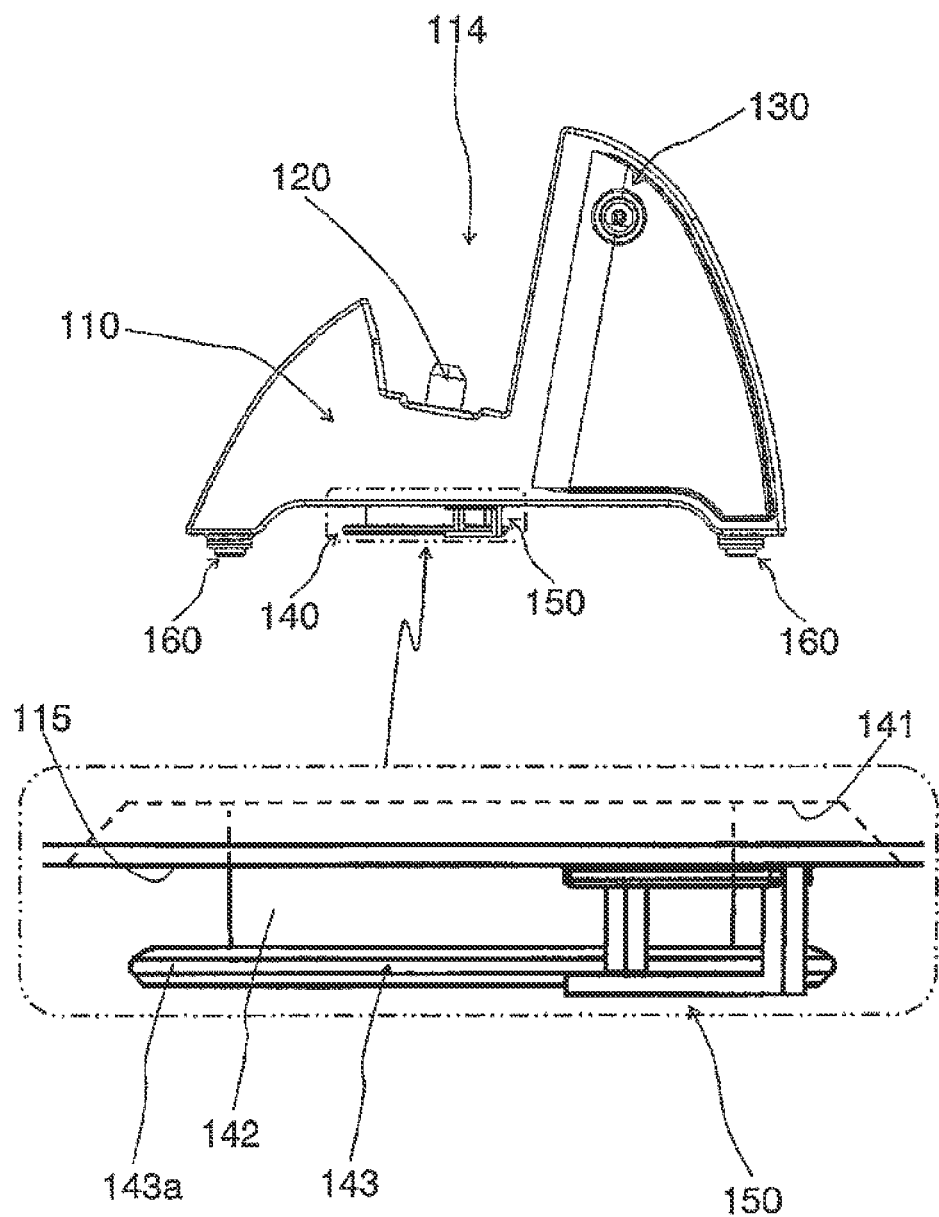
FIG. 4 is a plan view and a partially enlarged view showing the charging stand as seen from its right side.

The power connector 130 is disposed at a side surface (side outer surface) of the housing 110 as shown in FIG. 1 and is configured such that, as shown in FIG. 3, a connection plug 230 of the AC adapter unit 200 is detachably fitted thereinto.

Figure 10:
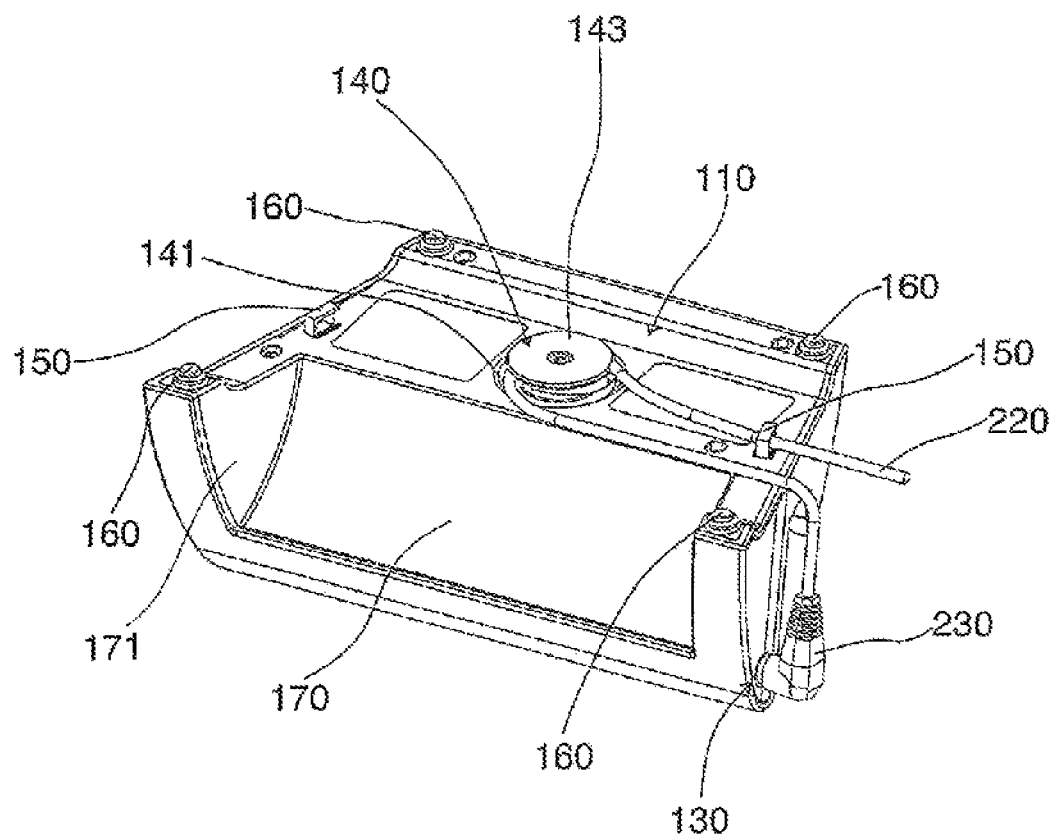
FIG. 10 is a perspective view showing one embodiment of attaching the AC adapter unit to the charging stand.

As shown in FIGS. 4 to 7, the cord winding structure 140 is disposed at a bottom surface (bottom outer surface) 115 of the housing 110. As shown in FIG. 10 and so on, the cord winding structure 140 is provided for partially allowing a first power cord 220 to be wound thereon.

As shown in FIGS. 4 to 7, the cord winding structure 140 comprises a cord receiving recess 141, a cord winding portion 142, a flange member 143, and a fixing screw 144.

Figure 5:
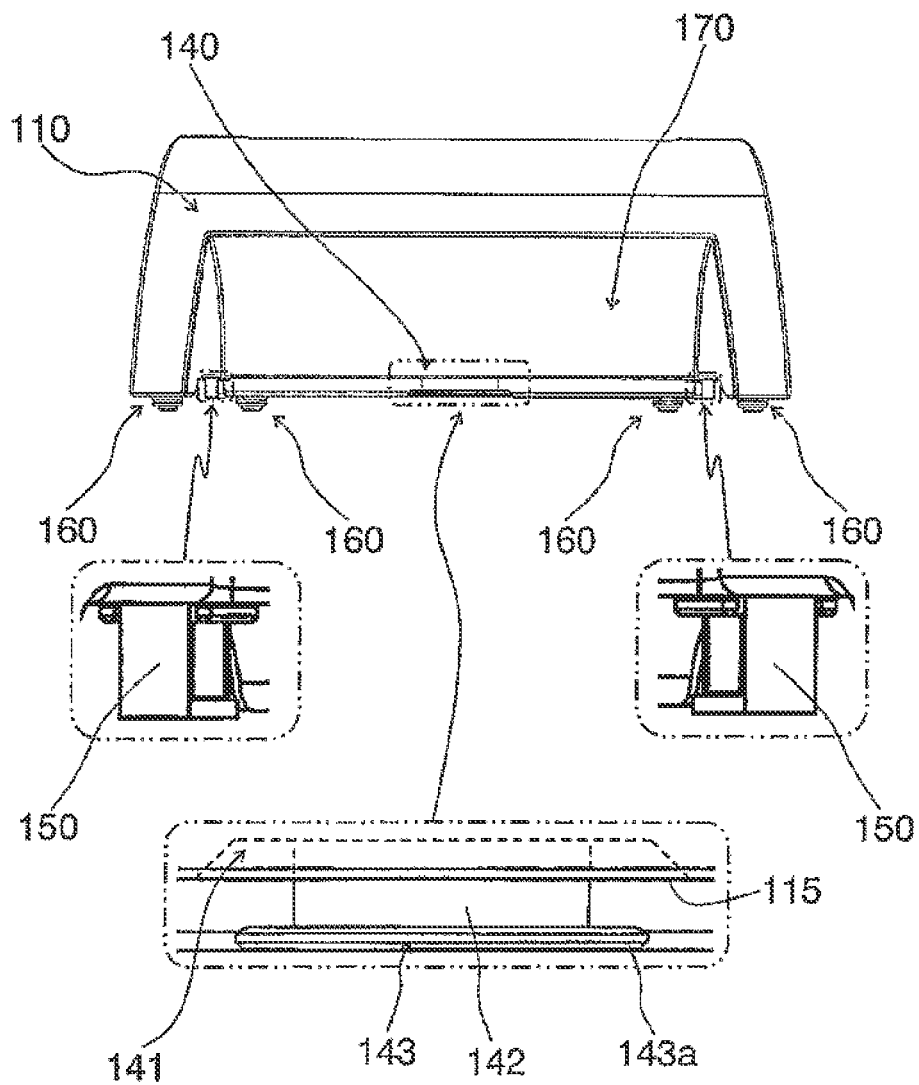
FIG. 5 is a plan view and a partially enlarged view showing the charging stand as seen from its rear side.
Figure 6:
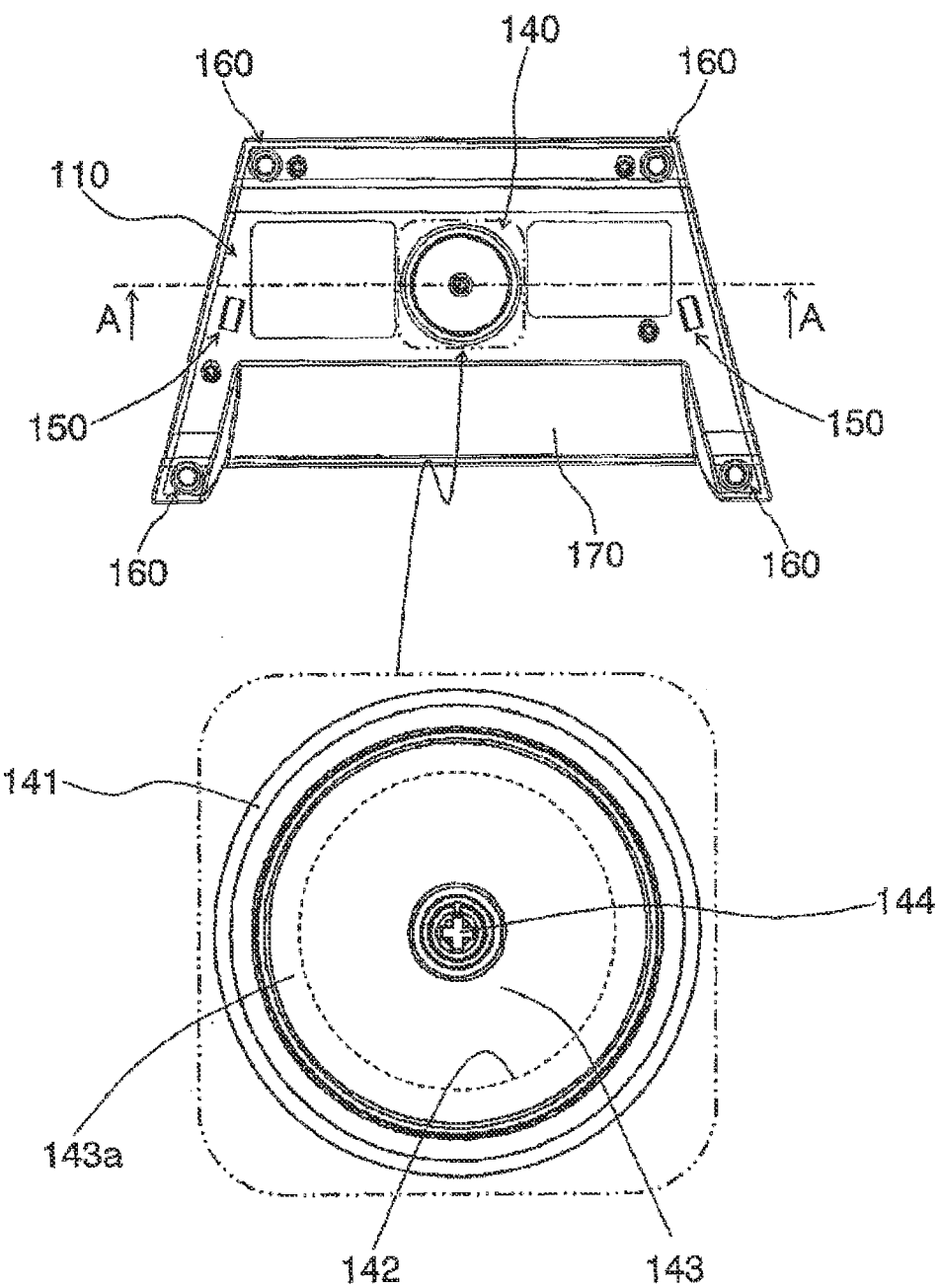
FIG. 6 is a plan view and a partially enlarged view showing the charging stand as seen from its bottom side.
Figure 7:
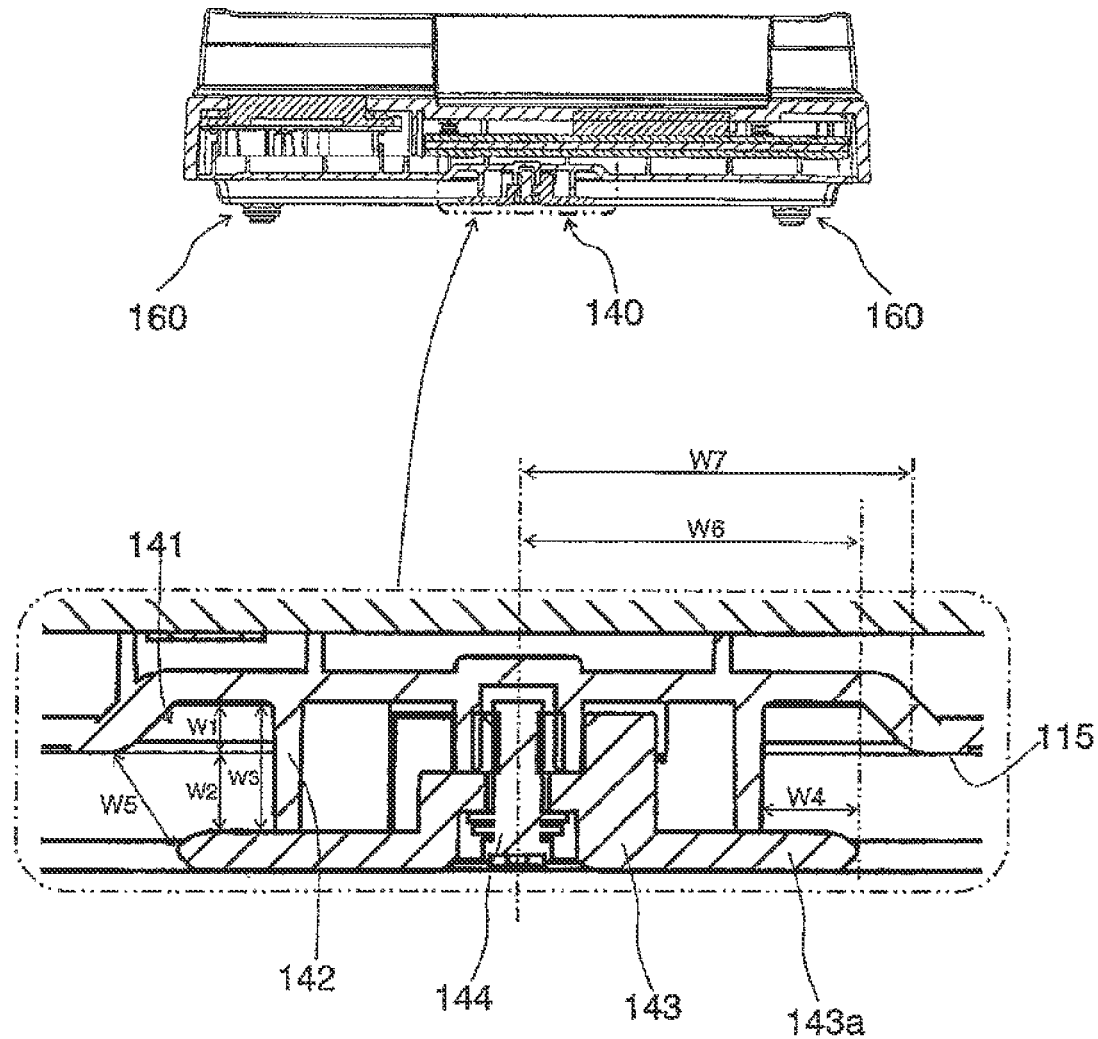
FIG. 7 is a cross-sectional view and a partially enlarged view showing the charging stand as seen in an arrow direction at an A-A line position in FIG. 6.

As shown in FIGS. 4 to 7, the cord receiving recess 141 is concavely provided on the bottom surface 115 of the housing 110. As shown in FIG. 6, the cord receiving recess 141 is formed in a circular shape when seen from the bottom surface 115 side of the housing 110 and, as shown in FIG. 7, the cord receiving recess 141 has a tapered inner peripheral surface with its diameter decreasing from the lower to the upper side. As shown in FIG. 7 and so on, the cord receiving recess 141 surrounds the cord winding portion 142. The bottom surface 115 of the housing 110 is formed substantially flat except at the cord receiving recess 141.

As shown in FIG. 7, the cord winding portion 142 is formed by a hollow cylindrical portion protruding downward from the center of a recess bottom surface of the cord receiving recess 141. The cord winding portion 142 has a hollow cylindrical outer peripheral surface. As shown in FIG. 7, the cord winding portion 142 protrudes further downward than the bottom surface 115 of the housing 110.

As shown in FIG. 7, the flange member 143 is disposed on the lower end side of the cord winding portion 142 and fixed to the housing 110 by the fixing screw 144. As shown in FIG. 6, when seen from the bottom surface 115 side of the housing 110, the flange member 143 has an annular flange portion 143a located horizontally outward of the outer peripheral surface of the cord winding portion 142. An upper surface of the flange portion 143a faces the recess bottom surface of the cord receiving recess 141.

The inner peripheral surface of the cord receiving recess 141, the outer peripheral surface of the cord winding portion 142, and an outer peripheral surface of the flange portion 143a are formed in concentric circles with respect to a common axis extending vertically.

The dimensions of various portions of the cord winding structure 140 will be described with reference to FIG. 7.

A vertical distance W1 between the recess bottom surface of the cord receiving recess 141 and the bottom surface 115 of the housing 110 is set to be smaller than a diameter of the first power cord 220.

A vertical distance W2 between the upper surface of the flange portion 143a and the bottom surface 115 of the housing 110 is set to be slightly greater than the diameter of the first power cord 220.

A vertical distance W3 between the upper surface of the flange portion 143a and the recess bottom surface of the cord receiving recess 141 is set to be smaller than twice the diameter of the first power cord 220.

A horizontal dimension W4 between the outer peripheral surface of the cord winding portion 142 and an outer edge (outermost edge) of the flange portion 143a is set to be greater than the diameter of the first power cord 220.

A distance W5 between the outer peripheral edge of the flange portion 143a and an outer peripheral edge of the cord receiving recess 141, i.e. a distance W5 between the outer peripheral edge of the flange portion 143a and an outer peripheral edge, in the same plane as the bottom surface 115 of the housing 110, of the cord receiving recess 141 when seen in a cross section taken along a plane perpendicular to a horizontally extending axis as shown in FIG. 7, is set to be greater than the diameter of the first power cord 220.

A radius W7 of the outer peripheral edge of the cord receiving recess 141, i.e. a radius W7 of the outer peripheral edge of the cord receiving recess 141 in the same plane as the bottom surface 115 of the housing 110, is set to be greater than a radius W6 of the outer peripheral edge of the flange portion 143a.

As shown in FIGS. 5 and 6, the fixing portions 150 are disposed at the bottom surface 115 of the housing 110 in the proximity of both left and right side portions of the housing 110, respectively, and each adapted to detachably fix the first power cord 220 thereto.

Figure 8:
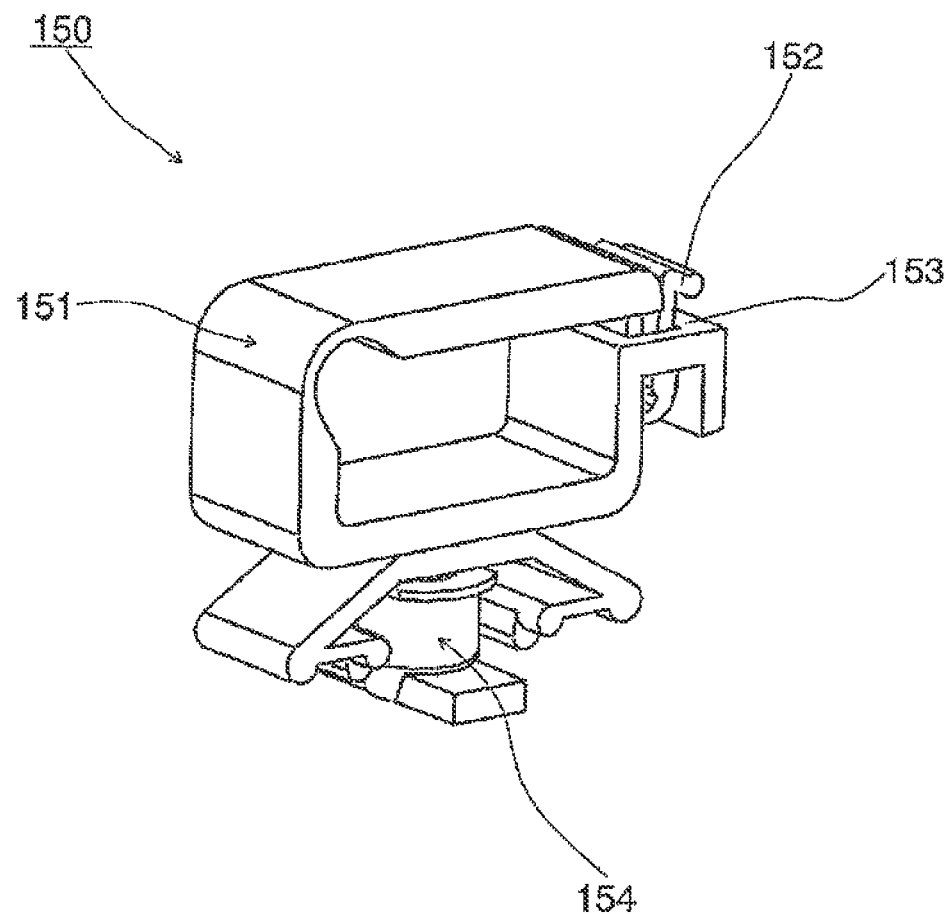
FIG. 8 is a perspective view showing a fixing portion.
Figure 9:
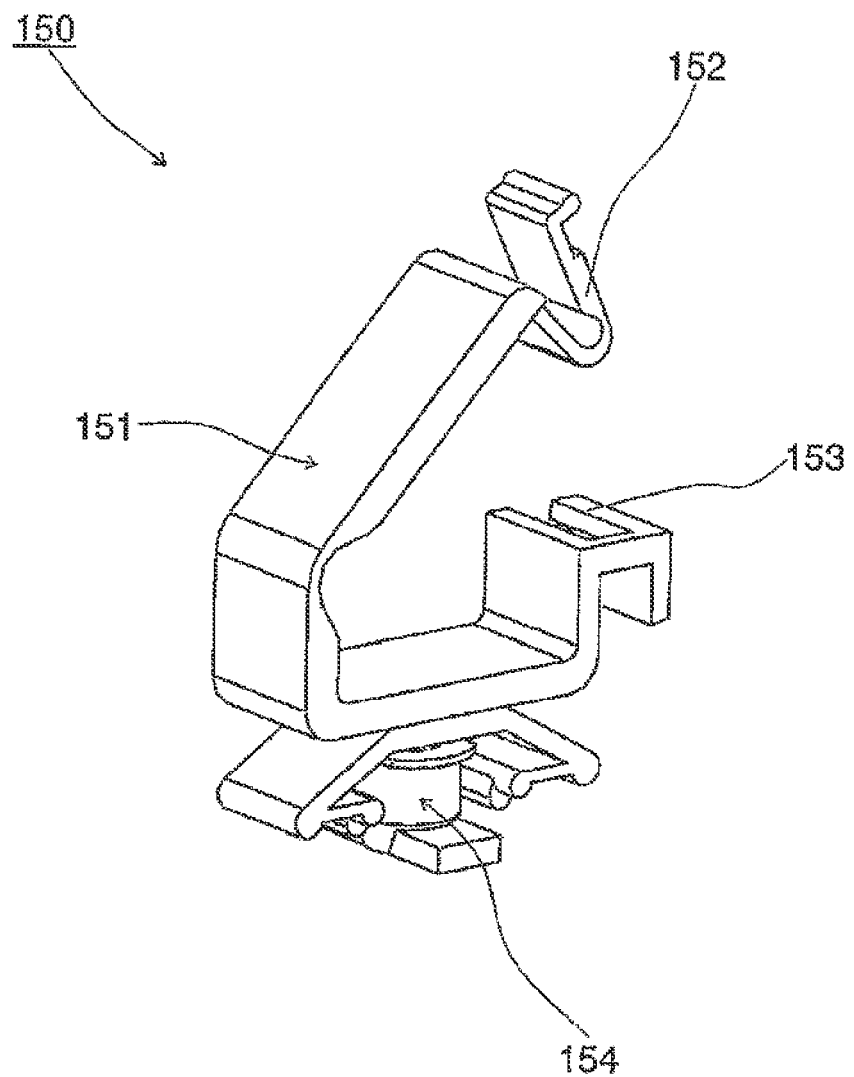
FIG. 9 is a perspective view showing a state where the fixing portion is opened.

As shown in FIGS. 8 and 9, each fixing portion 150 has a holder portion 151 for holding the first power cord 220 by surrounding it, an elastic locked portion-to-be (i.e., a portion to be locked) 152 formed at one end of the holder portion 151, a locking portion 153 formed at the other end of the holder portion 151 for detachably locking the locked portion-to-be 152, and a mounting portion 154 which is attached to the bottom surface 115 of the housing 110.

As shown in FIGS. 5 and 6, the leg portions 160 are attached to the bottom surface 115 of the housing 110 at four corners thereof, respectively. As shown in FIGS. 5 and 7, when the charging stand 100 is placed on a placement surface, the structural members other than the leg portions 160, such as, for example, the bottom surface 115 of the housing 110, the fixing portions 150, and the flange member 143, are not brought into contact with the placement surface.

Figure 11:
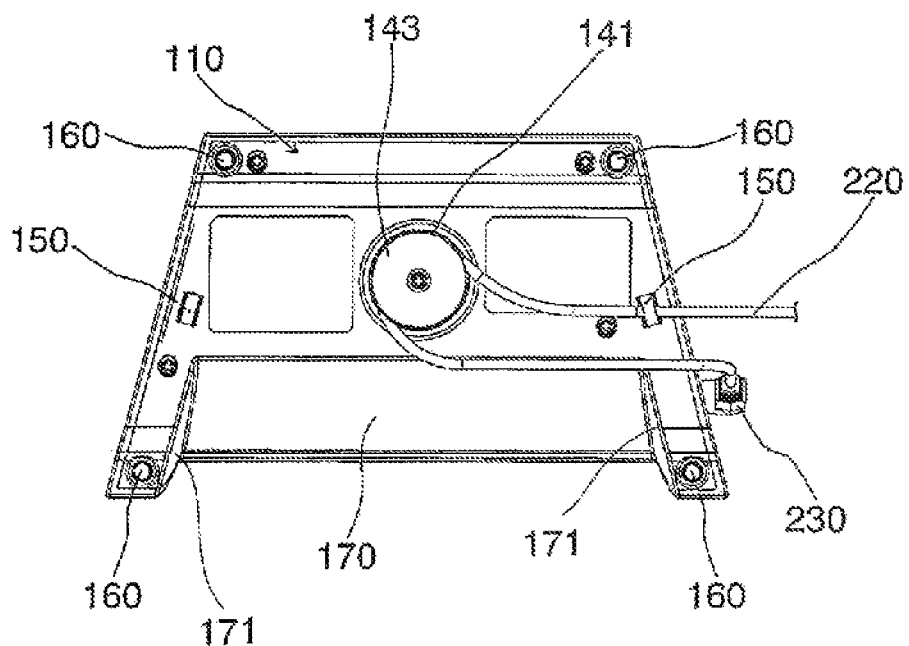
FIG. 11 is a plan view showing the state shown in FIG. 10 as seen from the bottom side of the charging stand.
Figure 13:
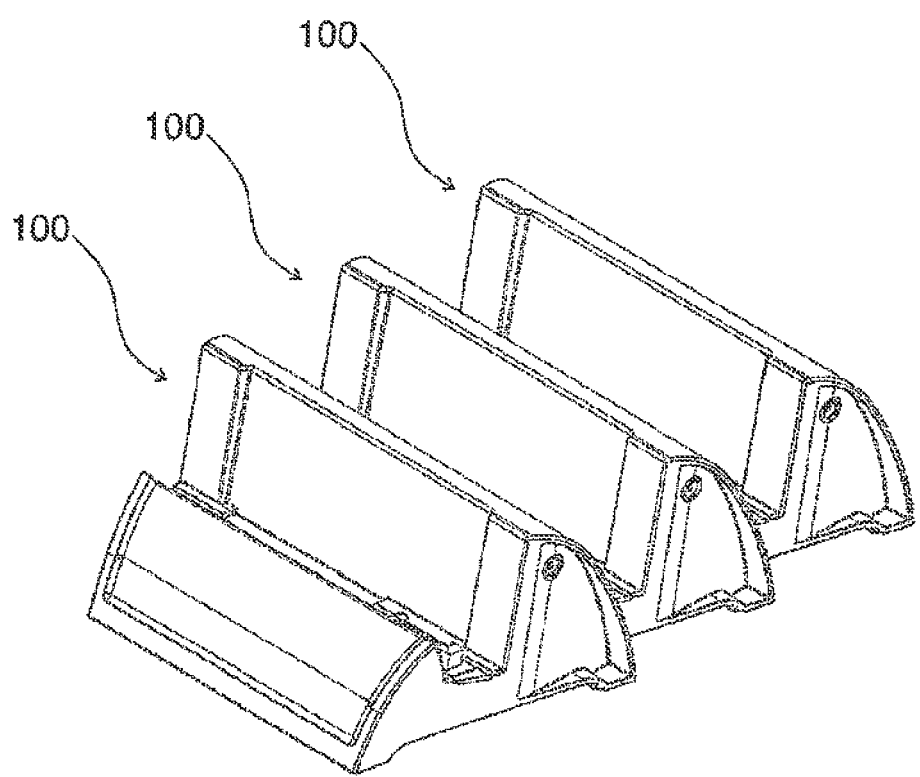
FIG. 13 is a perspective view showing a state where a plurality of charging stands are arranged side by side in a front-rear direction.
Figure 14:
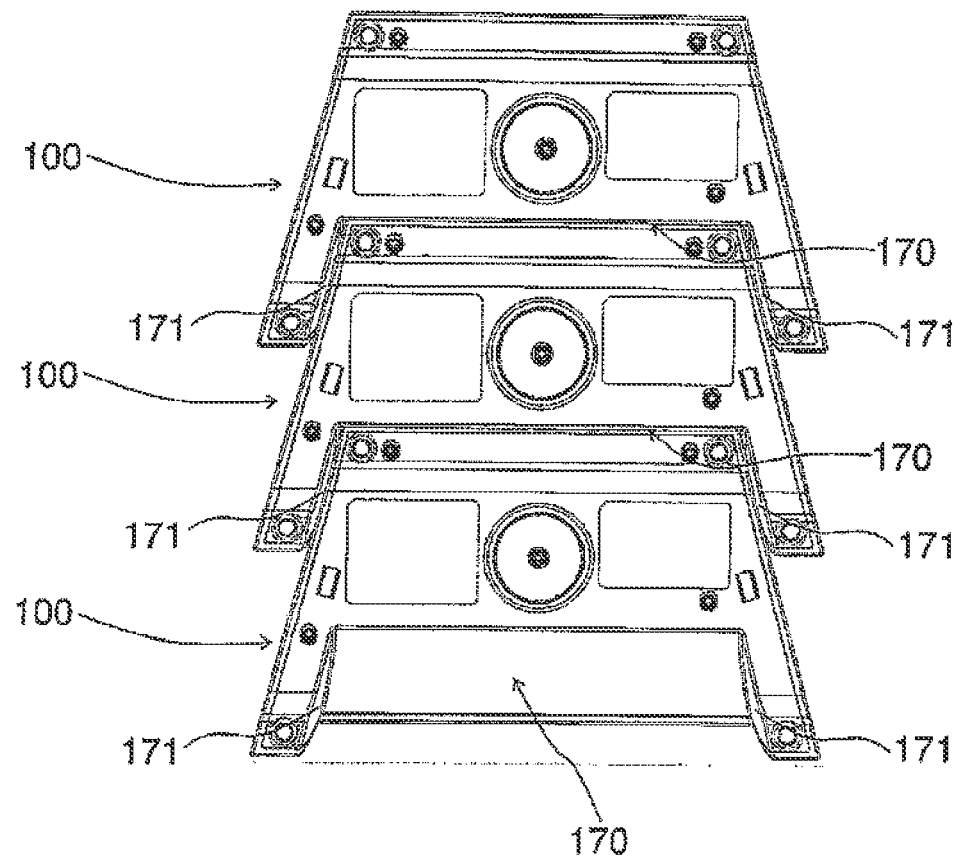
FIG. 14 is a plan view showing the state shown in FIG. 13 as seen from the bottom side of the charging stand.

As shown in FIGS. 10 and 11, the receiving recess 170 is formed on a rear surface of the housing 110 and has a shape conforming to the shape of a front end portion of the housing 110. As shown in FIGS. 13 and 14, it is configured such that when a plurality of charging stands 100 are arranged side by side in a front-rear direction, the receiving recess 170 of each charging stand 100 is adapted to receive therein the front end portion of the housing 110 of the charging stand 100 arranged behind it. The relative lateral offset between these plurality of charging stands 100 is restricted by left and right inner side surfaces 171 of the receiving recesses 170.

Figure 15:
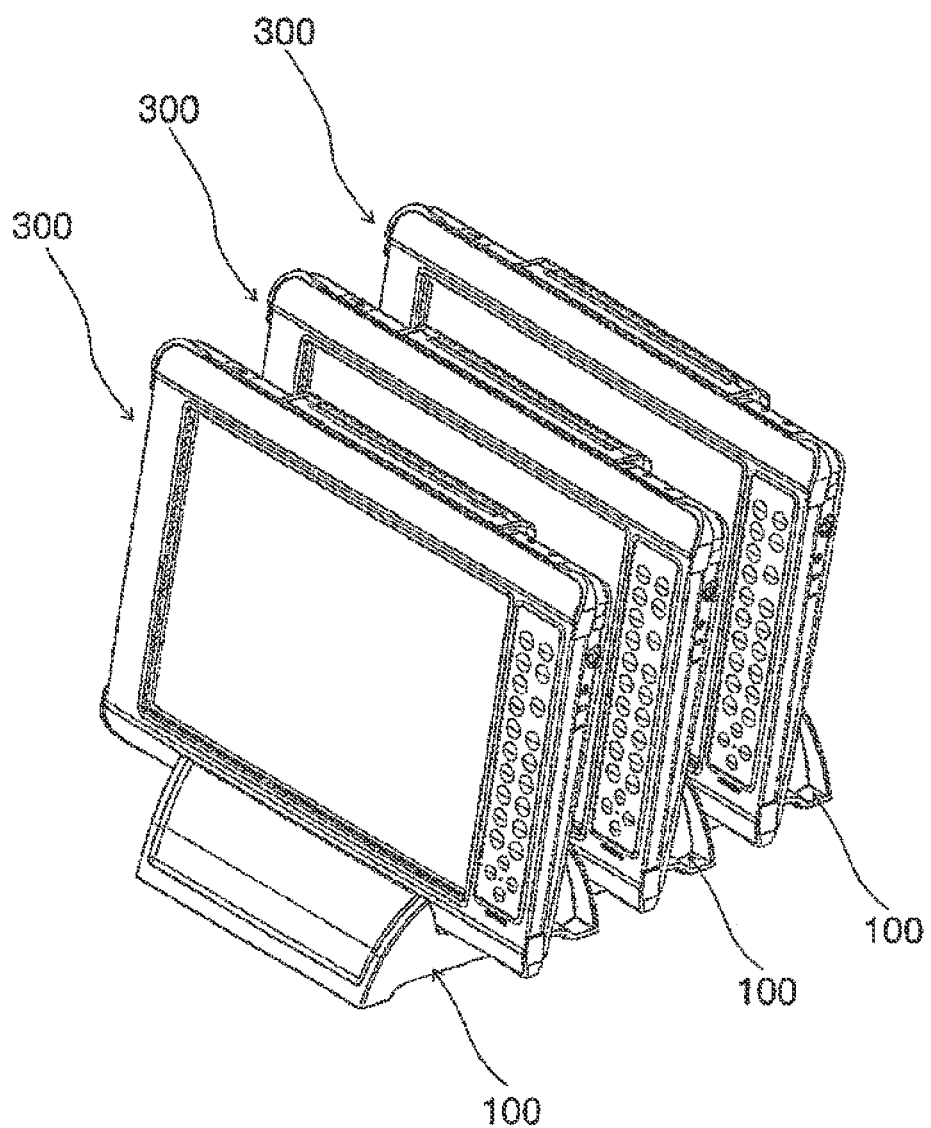
FIG. 15 is a perspective view showing a state where a plurality of charging stands are arranged side by side in a front-rear direction and electronic apparatuses are placed on the plurality of charging stands.

In the state where the plurality of charging stands 100 are arranged side by side in the front-rear direction as shown in FIGS. 13 and 14, the charging stands 100 of this invention can charge a plurality of electronic apparatuses 300 as shown in FIG. 15 (AC adapter units 200 are not illustrated). That is, in the state where the plurality of charging stands 100 are arranged side by side in the front-rear direction as shown in FIGS. 13 and 14, the distance between the adjacent charging stands 100 is set such that when the electronic apparatus 300 is placed on the seat portion 114 of the rear charging stand 100, the electronic apparatuses 300 does not interfere with the housing 110 of the front charging stand 100.

The AC adapter unit 200 is adapted to supply power to the charging stand 100. As shown in FIG. 3, the AC adapter unit 200 comprises an AC adapter (AC/DC adapter) 210, the flexible first power cord 220 for connection between the AC adapter 210 and the charging stand 100, and the connection plug 230 provided at one end of the first power cord 220 and adapted to be fitted into the power connector 130 of the charging stand 100. The AC adapter unit 200 further comprises a flexible second power cord 240 adapted to be detachably attached to the AC adapter 210 for connection between the AC adapter 210 and a commercial power supply, and a power plug 250 provided at one end of the second power cord 240 and adapted to be fitted into a socket (not illustrated) of the commercial power supply. The first power cord 220 has a circular (or substantially circular) cross-sectional shape.

In this embodiment, the electronic apparatus 300 is configured as a terminal for business which is used in the distribution industry, the manufacturing industry, the medical site, and so on. The electronic apparatus 300 may comprise a touch panel display 310 (FIG. 2), a housing 320 (FIG. 2), a control section (not illustrated), a storage section (not illustrated), a network interface (not illustrated), a secondary storage unit (not illustrated), and so on, in addition to the charging terminal (not illustrated) arranged at a position which is brought into contact with the charging terminal 120 of the charging stand 100 when the electronic apparatus 300 (FIG. 2) is placed on the charging stand 100, and in addition to the secondary battery (not illustrated) connected to the charging terminal (not illustrated).

Next, referring to FIGS. 10 to 12, methods of attaching the AC adapter unit 200 (first power cord 220) to the charging stand 100 of this embodiment will be described by way of example.

First, in the example shown in FIGS. 10 and 11, the first power cord 220 is wound by about one and a half turns around the cord winding structure 140, then fixed by the fixing portion 150 at the right side portion of the housing 110, and then led out to the outside from the right side portion of the housing 110.

Figure 12:
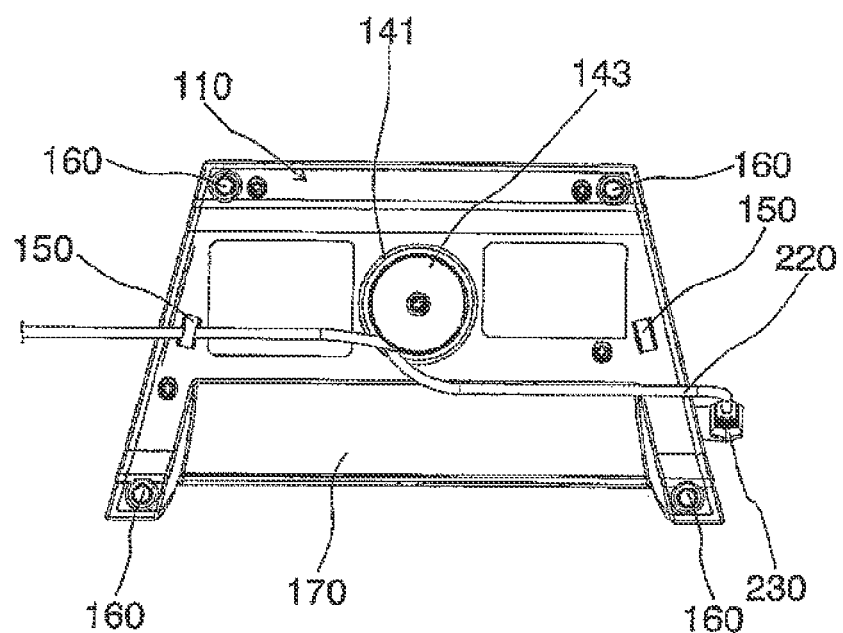
FIG. 12 is a plan view, as seen from the bottom side of the charging stand, showing another embodiment of attaching the AC adapter unit to the charging stand.

On the other hand, in the example shown in FIG. 12, the first power cord 220 is wound by about one turn around the cord winding structure 140, then fixed by the fixing portion 150 at the left side portion of the housing 110, and then led out to the outside from the left side portion of the housing 110.

As described above, according to the charging stand 100 of this embodiment, it is possible to arbitrarily select from which of the left and right side portions of the charging stand 100 the first power cord 220 is led out, depending on an environment where the charging stand 100 is placed, and so on.

According to the charging stand 100 of this embodiment thus obtained, the cord winding structure 140 is provided at the bottom surface 115 of the housing 110. Therefore, a force applied to the first power cord 220, the second power cord 240, or the AC adapter 210 is prevented from being imposed directly on a joining or connecting portion between the charging stand 100 and the first power cord 220 (in this embodiment, to the power connector 130 and the connection plug 230) only by winding the first power cord 220 around the cord winding structure 140. As a result, it is possible to prevent the power connector 130 and the connection plug 230 from being damaged or to prevent the connection plug 230 from coming off the power connector 130.

Further, the cord winding structure 140 is disposed at the outer surface of the housing 110. With this structure, when a user carries out an operation of winding the first power cord 220, it is not necessary to carry out an operation, other than winding the first power cord 220, such as, for example, opening and closing a cover of the housing 110. In other words, it is necessary to carry out only an operation of winding the first power cord 220 around the cord winding portion 142 of the cord winding structure 140. Therefore, the operation of winding the first power cord 220 can be achieved simply and easily.

Further, the bottom surface 115 of the housing 110 is formed flat. In addition, the vertical distance W2 between the upper surface of the flange portion 143a and the bottom surface 115 of the housing 110 is set to be greater than the diameter of the first power cord 220, and the distance W5 between the outer peripheral edge of the flange portion 143a and the outer peripheral edge of the cord receiving recess 141 is set to be greater than the diameter of the first power cord 220. Therefore, when carrying out an operation of winding the first power cord 220 with respect to the cord winding structure 140, it is possible to wind the first power cord 220 around the cord winding portion 142 while moving the first power cord 220 along the bottom surface 115 of the housing 110. Accordingly, the operation of winding the first power cord 220 with respect to the cord winding structure 140 can be achieved smoothly and easily.

Further, the cord winding structure 140 is disposed at the bottom portion of the housing 110, when the charging stand 100 is placed on the placement surface in the state where the first power cord 220 is wound around the cord winding structure 140. Therefore, the cord winding structure 140 and the first power cord 220 are located at the bottom portion of the housing 110. This structure makes it possible to reduce the possibility that a user's hand or the like catches the first power cord 220 and to prevent the beauty of the charging stand 100 from being spoiled.

Further, since the cord winding structure 140 and the fixing portions 150 are provided, the surplus length of the first power cord 220 can be arbitrarily adjusted depending on an environment where the charging stand 100 is placed, and so on.

Further, the cord receiving recess 141 is concavely provided on the bottom surface 115 of the housing 110 to ensure a receiving space for the first power cord 220 also on the side above the bottom surface 115 of the housing 110. Accordingly, it is possible to reduce the protruding amount of the cord winding structure 140 (the cord winding portion 142 and the flange member 143) from the bottom surface 115 of the housing 110 while ensuring the receiving space for the first power cord 220. Therefore, it is possible to reduce the height from the placement surface of the charging stand 100 to the bottom surface 115 of the housing 110.

When the first power cord 220 is wound by one or more turns around the cord winding portion 142, an overlapping portion of the first power cord 220 is formed. However, in this embodiment, it is to be noted that the distance W3 between the upper surface of the flange portion 143a and the recess bottom surface of the cord receiving recess 141 is set to be smaller than twice the diameter of the first power cord 220. Therefore, the overlapping portion of the first power cord 220 is compressed between the upper surface of the flange portion 143a and the recess bottom surface of the cord receiving recess 141 so that the friction between the first power cord 220, the flange portion 143a, and the cord receiving recess 141 increases. Consequently, the cord holding force for the first power cord 220 by the cord winding structure 140 can be improved.

Further, the flange portion 143a located horizontally outward of the outer peripheral surface of the cord winding portion 142 has an annular shape. This makes it possible to reliably prevent the first power cord 220 from coming off the cord winding structure 140 by means of the flange portion 143a regardless of the winding state such as the winding start position or the winding finish position of the first power cord 220 with respect to the cord winding structure 140.

Furthermore, the horizontal dimension W4 between the outer peripheral surface of the cord winding portion 142 and the outer edge of the flange portion 143a is set to be greater than the diameter of the first power cord 220. Therefore, it is possible to reliably prevent the first power cord 220 from coming off the cord winding structure 140 by means of the flange portion 143a.

Further, the fixing portions 150 each adapted to detachably fix the first power cord 220 thereto are arranged at the bottom surface 115 of the housing 110 near both left and right side portions of the housing 110, respectively. With this structure, it is possible to arbitrarily select from which of the left and right side portions of the charging stand 100 the first power cord 220 is led out, depending on an environment where the charging stand 100 is placed, and so on.

Further, the receiving recess 170 having the shape conforming to the shape of the front end portion of the housing 110 is provided on the rear surface of the housing 110, when the plurality of charging stands 100 are arranged side by side in the front-rear direction. Accordingly, the receiving recess 170 of the housing 110 arranged forward can receive therein the front end portion of the housing 110 arranged rearward. Therefore, it is possible to reduce the placement area which is required for arranging the plurality of charging stands 100. In addition, since the relative lateral offset between the plurality of charging stands 100 is prevented by the left and right inner side surfaces 171 of the receiving recesses 170. Thus, it is possible to maintain the state where the plurality of charging stands 100 are aligned in the front-rear direction.

Further, the fixing portions 150 each adapted to detachably fix the first power cord 220 thereto are each disposed at the bottom surface 115 of the housing 110 in the proximity of the side portion of the housing 110, when the first power cord 220 is fixed using the fixing portion 150. As a result, the first power cord 220 is led out to the outside from the side portion of the charging stand 100. Therefore, even when the plurality of charging stands 100 are arranged side by side in the front-rear direction as described above, it is possible to prevent the first power cords 220 from hindering the alignment of the plurality of charging stands 100 in the front-rear direction.

DESCRIPTION OF SYMBOLS 100 charging stand
110 housing
111 base portion
112 front support portion
113 back support portion
114 seat portion
115 bottom surface of housing
120 charging terminal
130 power connector
140 cord winding structure
141 cord receiving recess
142 cord winding portion
143 flange member
143a flange portion
144 fixing screw
150 fixing portion
151 holder portion
152 locked-portion-to-be
153 locking portion
154 mounting portion
160 leg portion
170 receiving recess
171 inner side surface
200 AC adapter unit
210 AC adapter
220 first power cord
230 connection plug
240 second power cord
250 power plug
300 electronic apparatus
310 touch panel display
320 housing

The invention claimed is:

1. A charging stand comprising a housing, the charging stand comprising:
a seat portion configured to hold an electronic apparatus therein, and a charging mechanism for charging the electronic apparatus when the electronic apparatus is held in the seat portion,
the housing comprising a front support portion configured to be adjacent to a front side of the electronic apparatus when the electronic apparatus is held in the seat portion, and a rear support portion configured to be adjacent to a rear side of the electronic apparatus when the electronic apparatus is held in the seat portion, wherein the seat portion is formed between the front support portion and the rear support portion;
wherein the charging stand is a first charging stand which is combinable with a second charging stand, the second charging stand comprising a seat portion for placing another electronic apparatus thereon;
wherein the first charging stand comprises a receiving recess formed on a rear surface of the housing, behind the rear support portion, the receiving recess having a shape which conforms to a shape of a front end portion of a housing of the second charging stand and which is adapted to receive therein the front end portion of the housing of the second charging stand, the front end portion of the housing of the second charging stand comprising a front surface,
wherein a rear surface of the receiving recess of the first charging stand is concave and configured to receive the front end portion of the second charging stand therein,
wherein the receiving recess of the first charging stand is configured to receive the front end portion of the second charging stand so that the front end portion of the second charging stand is overlapped with the receiving recess of the first charging stand, thereby reducing an occupied area of the housing of the first charging stand and the housing of the second charging stand when the front end portion of the second charging stand is received within the receiving recess of the first charging stand, and the rear surface of the receiving recess of the first charging stand is configured to contact the front surface of the second charging stand, and wherein, when the receiving recess of the first charging stand receives and is in contact with the front end portion of the second charging stand, the first charging stand is configured to charge the electronic apparatus held in the seat portion of the first charging stand.

2. The charging stand according to claim 1, wherein the charging stand has a cord winding structure which is provided on a bottom surface of the housing and which is for winding thereon a power cord adapted to be connected to the charging stand.

3. The charging stand according to claim 1, wherein the receiving recess has inner side surfaces extending substantially parallel to a front-rear direction to restrict relative lateral offset between the first charging stand and the second charging stand when the first charging stand and the second charging stand are arranged side by side in the front-rear direction.

* * * * *